(12) United States Patent
Ferris

(10) Patent No.: US 11,333,130 B2
(45) Date of Patent: May 17, 2022

(54) WIND TURBINE BLADE RAILROAD FIXTURE SYSTEM AND METHOD

(71) Applicant: John L. Ferris, Colleyville, TX (US)

(72) Inventor: John L. Ferris, Colleyville, TX (US)

(73) Assignee: BNSF Logistics, LLC, Springdale, AR (US)

( * ) Notice: Subject to any disclaimer, the term of this patent is extended or adjusted under 35 U.S.C. 154(b) by 222 days.

(21) Appl. No.: 16/811,344

(22) Filed: Mar. 6, 2020

(65) Prior Publication Data
US 2021/0277875 A1 Sep. 9, 2021

(51) Int. Cl.
| | | |
|---|---|---|
| *B60P 7/08* | (2006.01) | |
| *F03D 13/40* | (2016.01) | |
| *B61D 45/00* | (2006.01) | |
| *B61D 3/08* | (2006.01) | |
| *B60P 3/40* | (2006.01) | |
| *B60P 7/12* | (2006.01) | |

(52) U.S. Cl.
CPC ............... *F03D 13/40* (2016.05); *B60P 3/40* (2013.01); *B60P 7/12* (2013.01); *B61D 3/08* (2013.01); *B61D 45/001* (2013.01)

(58) Field of Classification Search
CPC .... F03D 13/40; B60P 3/40; B60P 7/12; B60P 7/0892; F05B 2260/02
USPC ............................ 410/44, 45, 32–35, 53, 120
See application file for complete search history.

(56) References Cited

U.S. PATENT DOCUMENTS

| | | | |
|---|---|---|---|
| 7,670,090 B1 | 3/2010 | Landrum et al. | |
| 7,918,633 B2 * | 4/2011 | Llorente Gonzalez | ............ F03D 13/40 410/44 |
| 7,967,536 B2 * | 6/2011 | Broderick | ............... F03D 13/40 410/44 |
| 8,708,625 B1 | 4/2014 | Landrum et al. | |
| 9,315,200 B1 | 4/2016 | Landrum et al. | |
| 9,790,927 B1 | 10/2017 | Landrum et al. | |
| 2005/0002749 A1 * | 1/2005 | Andersen | .................. B60P 3/40 410/82 |
| 2013/0343827 A1 * | 12/2013 | Schibsbye | ................. B60P 3/40 410/45 |

* cited by examiner

*Primary Examiner* — Stephen T Gordon
(74) *Attorney, Agent, or Firm* — Dan Brown Law Office; Daniel R. Brown

(57) ABSTRACT

A rail fixture system for wind turbine blades on a consist three flatcars, includes a root-support fixture that enables lateral movement, a mid-support fixture with a pair of lateral guides on opposing sides of the to limit the blade's lateral movement, and blade-pusher posts adjacent a curved portion of the blade, coupled to gravity weights, that intermittently engage sides of the blade and apply gravity forces in response to relative lateral movement thereof around rail curves, and which bends the blade, applies a fulcrum force against the lateral guides, and translates the root end of the blade in an opposing lateral direction.

24 Claims, 12 Drawing Sheets

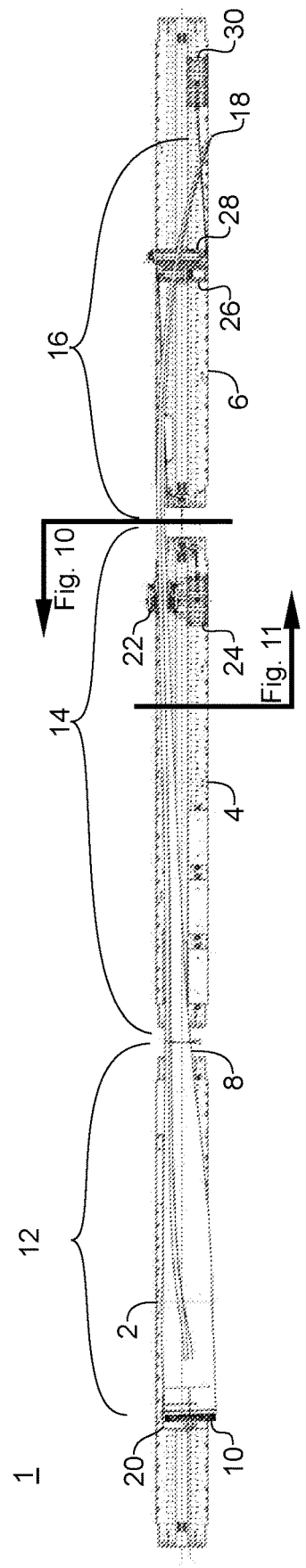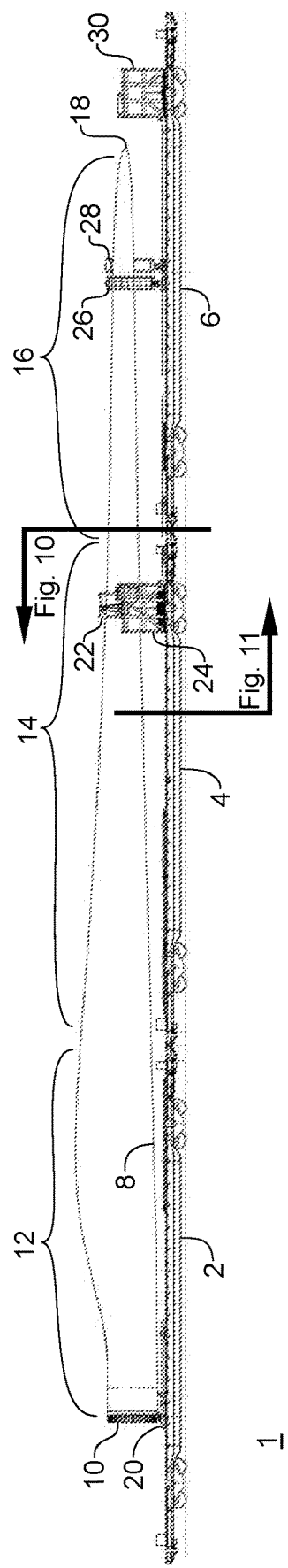

ations. The assignee of the present disclosure holds a range of US patents that are germane to the logistics of wind turbine blade transportation. These patents are listed below, and the entire contents and teachings of all of these patents are hereby incorporated by reference, and in their entirety, for all purposes.

WIND TURBINE BLADE RAILROAD FIXTURE SYSTEM AND METHOD

RELATED APPLICATIONS

None.

BACKGROUND OF THE INVENTION

Field of the Invention

The present invention relates to support fixtures for the transportation of wind turbine blades. More particularly, the present invention relates to support fixtures useful for transporting long wind turbine blades via rail on a consist of flatcars.

Description of the Related Art

The continued growth of wind power utilization has led to increasingly larger wind turbine structures. This has presented a number of challenges in the field of logistics for transporting wind turbine components from the points of manufacturer to the points of utilization. An important mode of transporting wind turbine blades, in particular, is railroad transport. In the case of very long and relatively fragile wind turbine blades, it becomes necessary to join plural railcars together to provide adequate length, corresponding to the length of the blade. This approach presents several logistical challenges relate to the movement, articulation, and clearances along railways.

The assignee of the present disclosure holds a range of US patents that are germane to the logistics of wind turbine blade transportation. These patents are listed below, and the entire contents and teachings of all of these patents are hereby incorporated by reference, and in their entirety, for all purposes.
- A) U.S. Pat. No. 7,591,621 issued on Sep. 22, 2009 to Landrum et al. for Wind Turbine Blade Transportation System and Method.
- B) U.S. Pat. No. 7,670,090 issued on Mar. 2, 2010 to Landrum et al. for Wind Turbine Blade Transportation System and Method.
- C) U.S. Pat. No. 8,708,625 issued on Apr. 29, 2014 to Landrum et al. for Wind Turbine Blade Railroad Transportation System and Method.
- D) U.S. Pat. No. 8,834,082 issued on Sep. 16, 2014 to Landrum et al. for Wind Turbine Blade Railroad Transportation System and Method.
- E) U.S. Pat. No. 9,315,200 issued on Apr. 19, 2016 to Landrum et al. for Wind Turbine Blade Railroad Transportation With Two Axis Translation.
- F) U.S. Pat. No. 9,347,426 issued on May 24, 2016 to Landrum et al. for Wind Turbine Blade Railroad Transportation System and Method.
- G) U.S. Pat. No. 9,494,140 issued on Nov. 15, 2016 to Sigurdsson for Frame Support Assembly For Transporting Wind Turbine Blades.
- H) U.S. Pat. No. 9,567,969 issued on Feb. 14, 2017 to Sigurdsson for Systems and Methods For Transporting Wind Turbine Blades.
- I) U.S. Pat. No. 9,790,927 issued on Oct. 17, 2017 to Landrum et al. for Wind Turbine Blade Double Pivot Transportation System and Method.
- J) U.S. Pat. No. 10,030,633 issued Jul. 24, 2018 to Sigurdsson for System and Method for Transporting Wind Turbine Blades.

Wind turbine blades lengths now require as many as three rail flatcars joined in a consist of railcars to provide adequate length for transport. For example, a seventy-one meter wind turbine blade necessitates the use of three eighty-nine foot flatcars. The flatcars, of course, are capable for movement along railways without special railway clearance consideration because the railcar couplers articulate movement between adjacent flatcars to accommodate track curvature, and passage through standard railway clearance profiles, as are understood by those skilled in the art. However, the wind turbine blade does not articulate and must therefore overhang the railway clearance profile as a train rounds a curved portion of track.

As any load on a railcar exceeds the railway clearance profile, it becomes incumbent upon logistics professionals to determine the extent of the overhang issues and identify railway routes that can accommodate such overhang. This, of course reduces the possible railway routes available for such loads, and increases the transportation costs. Thus it can be appreciated that there is a need in the art for improved fixtures designed to minimize the extend of railway profile clearance overhang for long wind turbine blades.

SUMMARY OF THE INVENTION

The need in the art is addressed by the systems and methods of the present invention. The present disclosure teaches a fixture system for rail transport of a wind turbine blade that extends longitudinally from a root-end through a middle-portion to a curved-portion, upon a consist of a root-support flatcar, a mid-support flatcar, and a blade-pusher flatcar. The system includes a root-support fixture on the root-support flatcar with an articulated mount connected to a bolster that supports the root-end of the blade, which enables a lateral translation path of the bolster together with the root-end of the blade. The system also includes a mid-support fixture on the mid-support flatcar with a blade sling slung from a support-frame to support the middle-portion of the blade, and with a first and a second lateral blade-guide on opposing sides of the middle-portion, to thereby limit lateral movement of the blade, and also to act as a fulcrum with respect to lateral forces applied elsewhere upon the blade. The system also includes first and second blade-pusher fixtures on the blade-pusher flatcar, each with a laterally articulated mount and blade-pusher posts extending therefrom aligned to intermittently engage opposing sides of the blade curved-portion, and each coupled to corresponding gravity weights through corresponding tension lines to apply gravity force laterally to the opposing sides, so as to enable lateral movement of the blade-pusher posts, in response to lateral movement of the blade relative to the consist during transport, and wherein, the gravity forces partially bend the blade, applies fulcrum forces against the lateral blade-guides, and translate the root end in an opposing lateral directions.

In a specific embodiment of the foregoing system, the root-support fixture articulated mount also includes a deck pivot attached to the root support flatcar, a radius arm pivotally coupled to the deck pivot at one end with a bolster engagement member at the other end, for supportively engaging the bolster, and to control the lateral translation path along an arcuate path.

In a specific embodiment of the foregoing system, the root support fixture further includes a bearing plate on the root-support flatcar that is positioned to slidably engage and support the bolster engagement member as it slides along the lateral translation path.

In a specific embodiment of the foregoing system, the the root-support fixture further includes a vertical retention member coupled to the root support flatcar, which is routed above the radius arm to limit its vertical movement and retain the radius arm in pivotal engagement with the deck pivot while still enabling the lateral translation path of the bolster.

In a specific embodiment of the foregoing system, the first blade-pusher post laterally articulated mount further includes a first guide rail attached to the blade-pusher flatcar and a first pusher-sled slideably engaged with the first guide rail along a lateral direction of movement, wherein the first blade-pusher post is fixed to the first pusher-sled. In a refinement to this embodiment, the first guide rail includes a pair of opposing channels with low friction liners that slidably engaging the first pusher-sled.

In a specific embodiment, the foregoing system further includes a first gravity-weight frame attached to the blade-pusher flatcar that retains and aligns the first gravity weight, and the first tension line is a chain that is routed around pulleys to couple the first blade-pusher post with the first gravity weight, and, the first gravity weight rests against the blade-pusher flatcar until the curved portion of the blade engages the first blade-pusher post and lifts the first gravity weight, which then couples the first gravity force through the first tension line. In a refinement this embodiment further includes a second gravity-weight frame attached to the mid-support flatcar that retains and aligns the second gravity weight, and the second tension line is a chain that is routed around pulleys between the mid-support flatcar and the blade-pusher flatcar, to couple the second blade-pusher post to the second gravity weight, and, the second gravity weight rests upon the mid-support flatcar until the curved portion of the blade engages the second blade-pusher post and lifts the second gravity weight, thereby creating the second force of gravity.

The present disclosure teaches a fixture system for rail transport of a wind turbine blade that extends from a root-end through a middle-portion to a curved-portion, upon a consist of a root-support flatcar, a mid-support flatcar, and a blade-pusher flatcar. The system includes a root-support fixture attached to the root-support flatcar that supports the root-end of the blade and enables lateral movement of the root-end during transport. The system also includes a mid-support fixture attached to the mid-support flatcar that supports the middle-portion of the blade, and includes a pair of lateral guides on opposing sides of the middle-portion to limit the blade's lateral movement, and also to act as a fulcrum with respect to lateral forces applied elsewhere upon the blade. The system further includes a blade-pusher fixture attached to the blade-pusher flatcar with a blade-pusher post aligned to intermittently engage a side of the curved-portion, wherein the blade-pusher post is coupled to a gravity weight through a tension line to apply gravity force laterally to the curved portion, and to move laterally itself, in response to lateral movement of the blade relative to the consist during transport, and wherein the gravity force partially bends the blade, applies a fulcrum force against one of the pair of lateral guides, and translates the root end in an opposing lateral direction, and wherein, loads applied to the root-support flatcar by the root support fixture produce first unbalanced loads thereupon, and loads applied to the mid-support flatcar by the mid-support fixture produce second unbalanced loads thereupon. The system then further including a first counterweight for disposition upon the root-support flatcar at a loaded-position selected to counterbalance the first unbalanced loads during loaded transport, and which is repositionable to a second position selected to balance the root-support flatcar during unloaded transport. Additionally, a second counterweight for disposition upon the mid-support flatcar at a loaded-position that is selected to counterbalance the second unbalanced loads during loaded transport, and wherein the second counterweight is repositionable to a second position selected to balance the mid-support flatcar during unloaded transport.

In a specific embodiment of the foregoing fixture system, the first counter weight and the second counterweight are fixed at their respective loaded positions and unloaded positions with twistlock fastener sets. In another specific embodiment, the system further includes a root support fixture lock that is attached to the root-support flatcar and engages with the root-support fixture during unloaded transport to prevent it from moving laterally.

The present disclosure teaches a fixture system for rail transport of a wind turbine blade that extends from a root-end through a middle-portion to a curved-portion, upon a consist of a root-support flatcar, a mid-support flatcar, and a blade-pusher flatcar. The system includes a root-support fixture attached to the root-support flatcar that supports the the root-end of the blade while enabling lateral movement during transport, and a mid-support fixture attached to the mid-support flatcar that supports the middle-portion of the blade, which includes a pair of lateral guides on opposing sides of the middle-portion to limit its lateral movement, and to act as a fulcrum with respect to lateral forces applied elsewhere upon the blade. The system also includes a blade-pusher fixture attached to the blade-pusher flatcar with a blade-pusher post aligned to intermittently engage a side of the curved-portion, which is coupled to a gravity weight through a tension line to apply gravity force laterally to the curved portion, and to move itself laterally, in response to lateral movement of the blade relative to the consist during transport, wherein the gravity force partially bends the blade, applies a fulcrum force against one of the pair of lateral guides, and translates the root end in an opposing lateral direction. In this embodiment, the curved-portion of the blade requires placement of the mid-support fixture at a position that overhangs the mid-support flatcar, and further requires placement of the blade-pusher fixture to overhang the blade-pusher flatcar. To improve balance and clearance, the mid-support fixture is repositionable between an overhung position for loaded transport, and a non-overhung position for unloaded transport. Likewise, the blade-pusher fixture is repositionable between an overhung position for loaded transport, and a non-overhung position for unloaded transport.

In a refinement to the foregoing embodiment, the blade-pusher fixture is repositioned to the non-overhung position by sliding the blade-pusher post inboard on the blade-pusher flatcar.

In a refinement to the foregoing embodiment, the mid-support fixture is repositioned at the non-overhung position with a repositionable attachment bracket that uses locating pins for both of the overhung position and the non-overhung position.

The present disclosure teaches a method of transporting by rail, a wind turbine blade that extends from a root-end through a middle-portion to a curved-portion upon a consist of a root-support flatcar, a mid-support flatcar, and a blade-pusher flatcar, using a fixture system that includes a root-support fixture with an articulated mount connected to a bolster that enables lateral movement thereof, a mid-support fixture with a blade sling slung from a support-frame with first and second lateral blade-guides, and, first and second blade-pusher fixtures, each having a laterally articulated mount with corresponding first and second blade-pusher post extending therefrom, and each with corresponding first and second gravity weights coupled with corresponding first and second tension lines. The method includes the steps of attaching the root-support fixture to the root-support flatcar and supporting the root-end upon the bolster, thereby enabling lateral movement of the bolster and the root-end of the blade together during transport, and includes the step of attaching the mid-support fixture to the mid-support flatcar and supporting the middle-portion of the blade upon the sling, and locating the first and second lateral guides on opposing sides of the middle-portion, thereby limiting lateral movement of the blade, and thereby enabling the lateral guides to act as fulcrums with respect to lateral forces applied elsewhere upon the blade. The method further includes the step of attaching the first blade-pusher fixture to the blade-pusher flatcar, and aligning the first blade-pusher post to intermittently engage a first side of the curved-portion of the blade, and coupling the the first blade pusher post to the first gravity weight through the first tension line, thereby applying a first gravity force laterally to a first side of the curved portion, and enabling lateral movement of the first blade-pusher post, in response to lateral movement in a first direction of the blade relative to the consist during transport, and further enabling the first gravity force to partially bend the blade, apply a first fulcrum force against the first lateral blade-guide, and translate the root end in an opposing lateral direction. The method also includes the step of attaching the second blade-pusher fixture to the blade-pusher flatcar, aligning the second blade-pusher post to intermittently engage a second side of the curved-portion, and coupling the second blade pusher post to the second gravity weight through the second tension line, thereby applying a second gravity force laterally to a second side of the curved portion, and enabling lateral movement of the second blade-pusher post, in response to lateral movement in a second direction of the blade relative to the consist during transport, and thereby enabling the second gravity force to partially bend the blade, and apply a second fulcrum force against the second lateral blade-guide, and translate the root end in an opposing lateral direction.

In a specific embodiment of the foregoing method, wherein the root-support fixture articulated mount includes a radius arm with a deck pivot at a first end, and a bolster engagement member at a second end, the method further includes the steps of attaching the deck pivot to the root-support flatcar, which defines an arcuate lateral translation path of the bolster engagement member at the second end, and the step of attaching the bolster to the bolster engagement member. In a refinement to this embodiment, wherein the root support fixture further includes a bearing plate, the method further includes the step of placing the bearing plate on the root-support flatcar at a position to slidably engage and support the bolster engagement member, thereby enabling it to slide along the lateral translation path. In another refinement to this embodiment, wherein the root-support fixture includes a vertical retention member, the method further includes coupling the vertical retention member to the root support flatcar and positioning it above the radius arm, thereby limiting vertical movement of the radius arm and retaining the radius arm in pivotal engagement with the deck pivot.

In a specific embodiment of the foregoing method, wherein the first blade-pusher post laterally articulated mount includes a first guide rail and a first pusher-sled, the method further includes attaching the first guide rail to the blade-pusher flatcar and slideably engaging the first pusher-sled with the first guide rail along a lateral direction of movement, and attaching the first blade-pusher post to the first pusher-sled. In a refinement to this embodiment the first guide rail includes a pair of opposing channels having low friction liners disposed therein for slidably engaging the first pusher sled.

In a specific embodiment, wherein the fixture system further includes a first gravity-weight frame, where the tension line is a chain, and includes at least a first pulley, the method further includes the steps of attaching the first gravity-weight frame to the blade-pusher flatcar, retaining and aligning the first gravity weight therein, and routing the first tension chain around the first pulley, thereby coupling the first blade-pusher post with the first gravity weight, wherein the first gravity weight rests upon the blade-pusher flatcar until the curved portion of the blade engages the first blade-pusher post and lifts the first gravity weight in response thereto, thereby coupling the first gravity force through the first tension line. In a refinement to this embodiment, wherein the fixture system includes a second gravity-weight frame, where the second tension line is a chain, and at least a second pulley, the method further includes attaching the second gravity-weight frame to the blade-pusher flatcar, retaining and aligning the second gravity weight therein, and routing the second tension chain around the second pulley, thereby coupling the second blade-pusher post with the second gravity weight, wherein the second gravity weight rests upon the blade-pusher flatcar until the curved portion of the blade engages the second blade-pusher post and lifts the second gravity weight in response thereto, thereby coupling the second gravity force through the first tension line.

The present disclosure teaches a method of transporting by rail, a wind turbine blade that extends from a root-end through a middle-portion to a curved-portion upon a consist of a root-support flatcar, a mid-support flatcar, and a blade-pusher flatcar, using a fixture system including a root-support fixture that enables lateral movement, a mid-support fixture that includes a pair of lateral guides, a blade-pusher fixture that includes a blade-pusher post, a gravity weight and connected tension line, and a first and second counterweight. The method includes the steps of attaching the root-support fixture to the root-support flatcar and supporting the root-end of the blade, where the load produces first unbalanced loads on the root-support flatcar, and wherein the root-support fixture enables lateral movement of the root-end during transport. And, the step of attaching the mid-support fixture to the mid-support flatcar and supporting the middle-portion load thereupon, where the load produces second unbalanced loads upon the mid-support flatcar. Also, aligning the pair of lateral guides on opposing sides of the middle-portion, thereby limiting lateral movement of the blade, and enabling the pair of lateral guides to act as a fulcrums with respect to lateral forces applied elsewhere on the blade. And, the steps of attaching the blade-pusher fixture to the blade-pusher flatcar, and aligning the blade-pusher post for intermittently engaging a side of the curved-portion, then coupling the gravity weight to the blade-pusher post using the tension line, thereby enabling application of gravity force laterally to the curved portion, and enabling lateral movement of the blade-pusher post, responsive to lateral movement of the blade relative to the consist during transport, and thereby, bending the blade, applying a fulcrum force against one of the pair of lateral guides, and translating the root end in an opposing lateral direction. The method further includes the step of counterbalancing the first unbalanced loads by selectively placing the first counterweight upon the root-support flatcar at a loaded-position for use during loaded transport, and, counterbalancing the second unbalanced load by selectively placing the second counterweight upon the mid-support flatcar at a loaded-position during loaded transport, and for unloaded transport, and repositioning the first counterweight at an unloaded position selected to balance the root-support flatcar during unloaded transport, and repositioning the second counterweight to an unloaded position selected to balance the mid-support flatcar during unloaded transport.

In a specific embodiment, the foregoing method includes the steps of attaching the first counter weight and the second counterweight at their respective loaded positions and unloaded positions using twistlock fastener sets.

In a specific embodiment, the foregoing method further includes the steps of locking the root-support fixture against lateral movement during unloaded transport of the consist.

The present disclosure teaches a method of transporting by rail, a wind turbine blade that extends from a root-end through a middle-portion to a curved-portion on a consist of a root-support flatcar, a mid-support flatcar, and a blade-pusher flatcar, using a fixture system including a root-support fixture that enables lateral movement, a mid-support fixture that includes a pair of lateral guides, a blade-pusher fixture that includes a blade-pusher post, a gravity weight and connected tension line, wherein the curved-portion of the blade dictates placement of the mid-support fixture at a position that overhangs the mid-support flatcar, and further dictates placement of the blade-pusher fixture to overhang the blade-pusher flatcar. The method includes the steps of attaching the root-support fixture to the root-support flatcar and supporting the root-end load, wherein the root-support fixture enables lateral movement of the root-end during transport, and, attaching the mid-support fixture to the mid-support flatcar at a loaded-transport position, where a portion of the mid-support fixture overhangs a side of the mid-support flatcar, and supporting the middle-portion load on the mid-support fixture, and aligning the pair of lateral guides on opposing sides of the middle-portion, thereby limiting lateral movement of the blade, and enabling the pair of lateral guides to act as a fulcrums with respect to lateral forces applied elsewhere upon the blade. The method also includes attaching the blade-pusher fixture to the blade-pusher flatcar, and aligning the blade-pusher post to a loaded-transport position to intermittently engage a side of the curved-portion, where a portion of the blade-pusher fixture overhangs the blade-pusher flatcar at the loaded-transport position. And, coupling the gravity weight to the blade-pusher post using the tension line, thereby enabling application of gravity force laterally on the curved portion, and enabling lateral movement of the blade-pusher post, responsive to lateral movement of the blade relative to the consist during transport, and thereby, bending the blade, applying a fulcrum force against one of the pair of lateral guides, and translating the root end in an opposing lateral direction. The method also includes the steps of unloading the blade from the consist, and repositioning the mid-support fixture to a non-overhung, unloaded-transport position, where the mid-support fixture does not overhang the mid-support flatcar, and repositioning the blade-pusher fixture to a non-overhung, unloaded transport, position where the blade-pusher fixture does not overhang the blade-pusher flatcar.

In a specific embodiment, the foregoing method further includes the steps of repositioning the blade-pusher fixture to the non-overhung position by sliding the blade-pusher post inboard on the blade-pusher flatcar.

In a specific embodiment, the foregoing method further includes the steps of repositioning the mid-support fixture to the non-overhung position with a repositionable attachment bracket having locating pins at both of the overhung position and non non-overhung position.

BRIEF DESCRIPTION OF THE DRAWINGS

FIG. 1 is a top view drawing of a rail flatcar consist for transporting a wind turbine blade according to an illustrative embodiment of the present invention.

FIG. 2 is a side view drawing of a rail flatcar consist for transporting a wind turbine blade according to an illustrative embodiment of the present invention.

DESCRIPTION OF THE INVENTION

Figure 3:
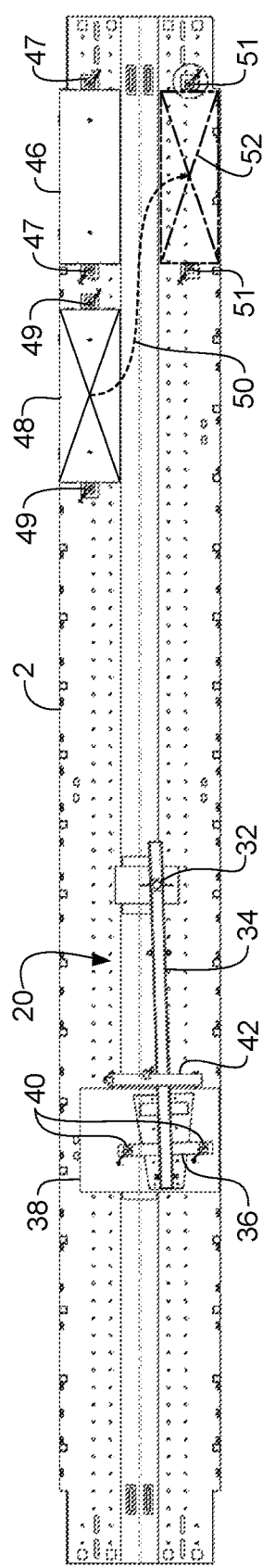
FIG. 3 is a top view drawing of a root-support flatcar according to an illustrative embodiment of the present invention.

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope hereof, and additional fields in which the present invention would be of significant utility.

In considering the detailed embodiments of the present invention, it will be observed that the present invention resides primarily in combinations of steps to accomplish various methods or components to form various apparatus and systems. Accordingly, the apparatus and system components, and method steps, have been represented where appropriate by conventional symbols in the drawings, showing only those specific details that are pertinent to understanding the present teachings so as not to obscure the disclosure with details that will be readily apparent to those of ordinary skill in the art having the benefit of the disclosures contained herein.

In this disclosure, relational terms such as first and second, top and bottom, upper and lower, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a" does not, without more constraints, preclude the existence of additional identical elements in the process, method, article, or apparatus that comprises the element.

Those skilled in the art of wind turbine blade logistics, particularly with regard to railroad transport, will be aware of the challenges in loading, securing, and transporting long structures, such as wind turbine blades (also referred to herein as a "blade"). At the time of this writing, commercial wind turbine blades range in length from approximately 48 meters to 71 meters, and longer blades are envisioned by suppliers. As such, these blades are much longer than the typical railcar. For example, the common rail flatcar is about 27 meters in length. Therefore, multiple railcars must be coupled together to provide adequate length to carry a single wind turbine blade, which may require two, three, or even four railcars joined together. The coupling of plural railcars to provide adequate length may hereinafter be referred to as a "consist" of railcars. The blade must be supported on at least two support fixtures and aligned along the longitudinal axis of the consist of railcars. As a side note for this disclosure, an axis generally aligned with the length of a consist of railcars will be referred to as a "longitudinal" axis. An axis that is generally transverse to a longitudinal axis, such as side-to-side of a railcar, will be referred to as a "lateral" axis. And, vertically aligned axes will be referred to as "vertical" axes. For example, the longitudinal axis of a wind turbine blade is generally aligned with the longitudinal axis of a consist of railcars. Although, there may be several angular degrees of misalignment with respect to these reference directions, as will be appreciated by those skilled in the art.

Since two support fixtures, minimum, are required to support a wind turbine blade, and since a consist may include more than two railcars, some of the railcars in a consist may be load bearing cars, referred to as "load" cars, and some railcars may be non load bearing cars, which may also be referred to a "idler" cars. It will be appreciated by those skilled in the art that the total mass borne by a railcar must result in a center of mass that is close to the longitudinal axis of the railcar and of the consist of railcars so as to avoid excessive tipping forces. Sometimes it is necessary to add counterweights to a railcar where the actual load cannot be so aligned. This is sometime the case for long, curved, wind turbine blades.

Longer wind turbine blades are commonly designed with a curved airfoil design, that 'flattens' out under wind loading. However, during transport, the curved shape, sometimes referred to as a "hockey stick" shape, must be addressed with respect to railway clearances. The logistics of wind turbine blade rail transport are facing increasing clearance issues as the blades become longer, and this challenge is exacerbated where the blade is curved. Considering the curvature of railroad tracks, and the undulations over hills and valleys, and the differences between how a consist of railcars traverse a curved section of rail, as compared to the relatively fixed shape of wind turbine blades, and it can be appreciated that clearance logistics is a major consideration in support fixture design and placement. With a two-point support system as discussed above, and the consist of railcars following a curved track, it can be appreciated that the blade axis generally defines a geometric chord along the curved track, where the ends and center portions of the blade overhang the clearance profile more so than where the track section is straight.

As noted above, wind turbine blades flex and flatten out curved portions during operation on a wind turbine generator, so it can be appreciated that the blade itself can accommodate dynamic bending over years of operation. This feature of the blade is advantageously utilized under the teachings of the present disclosure to reduce the amount of railway clearance profile overhang, which enables a greater range of railroad routing options for logistics professionals. It will also be noted that as a consist of railcars traverses right and left turns, and considering the aforementioned hockey-stick blade curvatures, the amount of overhang at the root end of the blade, the tip end of the blade, and the mid-section of the blade varies with the direction and degree of track curvature. A goal under the present disclosure is to balance these various overhang issues so as to minimize the maximum extent of any one of them. This improves the clearance issues and increases the number of routing options.

Another aspect of transporting long blades on a consist or railcars is the necessity of having certain portions of the fixture sets overhang the railcars, which are typically flatcars, well cars, and other railcars suitable for open loading (collectively referred to herein as "flatcars"). Yet another aspect is the aforementioned unbalanced conditions that must be addressed with the use of strategically placed counterweights. The nature of a consist of railcars is also important to consider. The fixture sets are typically welded to the flatcars, and the several flatcars are arranged in a particular order, so the consists move as a unit, in both the loaded and unloaded conditions. Therefore, unloaded consist balance and clearance issues are also important considerations under the present teachings.

Reference is directed to FIG. 1 and FIG. 2, which are a top view drawing and a side view drawing, respectively, of a rail flatcar consist 1 for transporting a wind turbine blade 8 according to an illustrative embodiment of the present invention. The rail flatcar consist 1 includes a root-support flatcar 2, a mid-support flatcar 4, and a blade-pusher flatcar 6. A wind turbine blade 8 rests upon the railcar consist 1, and is supported by two fixtures 20, 22. The blade 8 includes a root-portion 12, a middle-portion 14, and a curved-portion 16, which terminates at a tip end 18. These support fixtures include a root-support fixture 20 on the root-support flat car 2, which supports the root-portion 12 of the blade. And, a mid-support fixture 22, on the mid-support flatcar 4 which supports the middle-portion 14 of the blade 8. In addition, there are a pair of blade-pusher fixtures 26 and 28 located on the blade-pusher flat car 6. Blade-pusher fixture 26 is coupled to a first gravity-weight assembly 24 located on the mid-support flat car 4. Blade-pusher fixture 28 is coupled to a second gravity weight assembly 30 located on blade pusher flatcar 6. The blade pusher fixtures 26, 28 apply lateral forces against the curved-portion of the blade 8.

In FIGS. 1 and 2, note that the blade 8 overhangs the flatcars 2, 4, 6. Also note that the mid-support fixture 22 overhangs the mid-support flatcar 4. In addition, note that the blade-pusher fixture 28 overhangs the blade-pusher flatcar 6. When the railcar consists 1 traverses a curved portion of a railway (not shown), then the blade overhang distances increase. These increased overhangs may exceed the railway clearance profiles, and therefore limit the available routes for the consist 1. Note in FIG. 1 and FIG. 2 the section view references to FIG. 10 and FIG. 11.

Figure 4:
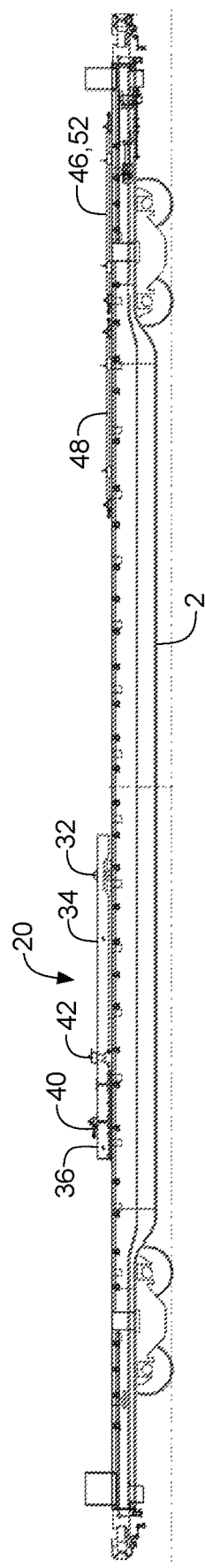
FIG. 4 is a side view drawing of a root-support flatcar according to an illustrative embodiment of the present invention.

Reference is directed to FIG. 3 and FIG. 4, which are a top view drawing and a side view drawing, respectively, of a root-support flatcar 2 according to an illustrative embodiment of the present invention. The root support fixture 20 is attached to the deck of the root support flatcar 2 at a deck pivot 32. The deck pivot 32 is welded to the rail car deck 2. A radius arm 34 is pivotally connected the deck pivot 32. A bolster engagement member 36 is attached to a second end of the radius arm 34. This arrangement enables an arcuate lateral translation path of the bolster engagement member 36 as defined by the deck pivot 32 and radius arm 34. A low friction bearing plate 38 is disposed upon the root support flat car 2 deck. The bearing plate 38 may be fabricated from a low friction material such as ultra-high-molecular-weight polyethylene (UHMWPE), or other suitable polymeric material. The bolster engagement member 36 may include twist lock fasteners 40 for attachment of a root bolster (not shown). In this manner the root bolster (not shown) may remain attached to the root and of the blade (not shown), and be selectively attached to the bolster engagement member 36. A vertical retention member 42 is placed above the radius arm 34, and attached to the root-support flatcar 2 deck, to prevent the radius arm 34 from lifting, to thereby maintaining the radius arm 34 in pivotal engagement with the deck pivot 32. A root support fixture lock 41 is provided to lock the position of the radius arm 34 against lateral movement, which is applied during unloaded transport of the consist.

The root-support flatcar 2 also includes plural counterweights 46, 48, which are sheets of steel plate in the illustrative embodiment. Counterweight 46 is attached to the flatcar 2 using a pair of twistlock fastener sets 47, as are known to those skilled in the art. Counterweight 48 is attached to the flatcar 2 with another pair of twistlock fastener sets 49. Note that both counterweights 46, 48 are on one side of the flatcar 2 to counterbalance the offset load of the blade (not shown), which is necessary for balance during loaded transport of the blade. The mass of the counterweights 46, 48 are selected based on the balancing requirement for a given wind turbine blade (not shown). However, during unloaded transport of the flatcar 2, it is necessary to reposition 50 counterweight 48 to a balanced position 52. When in the balanced position, counterweight 48 is fixed in position with twistlock fasteners 51, as illustrated.

Figure 5:
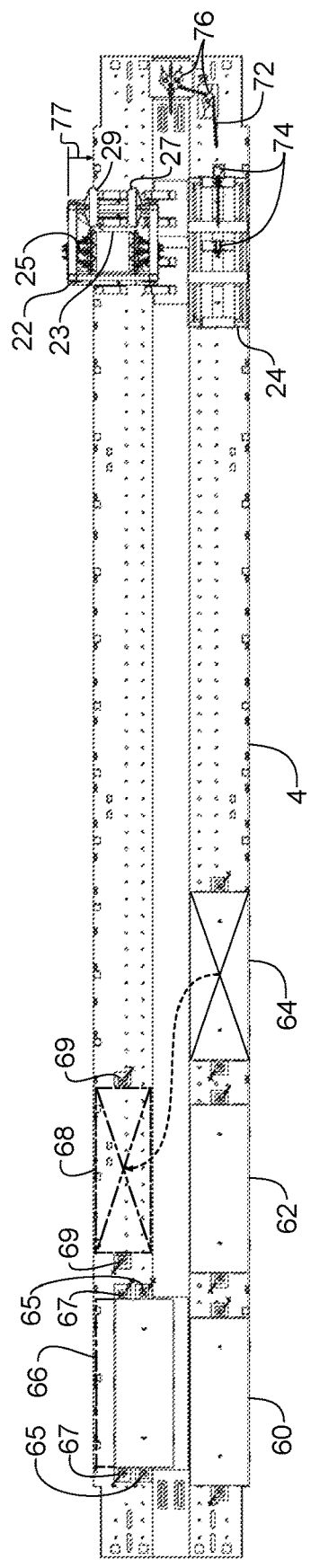
FIG. 5 is a top view drawing of a mid-support flatcar according to an illustrative embodiment of the present invention.
Figure 6:
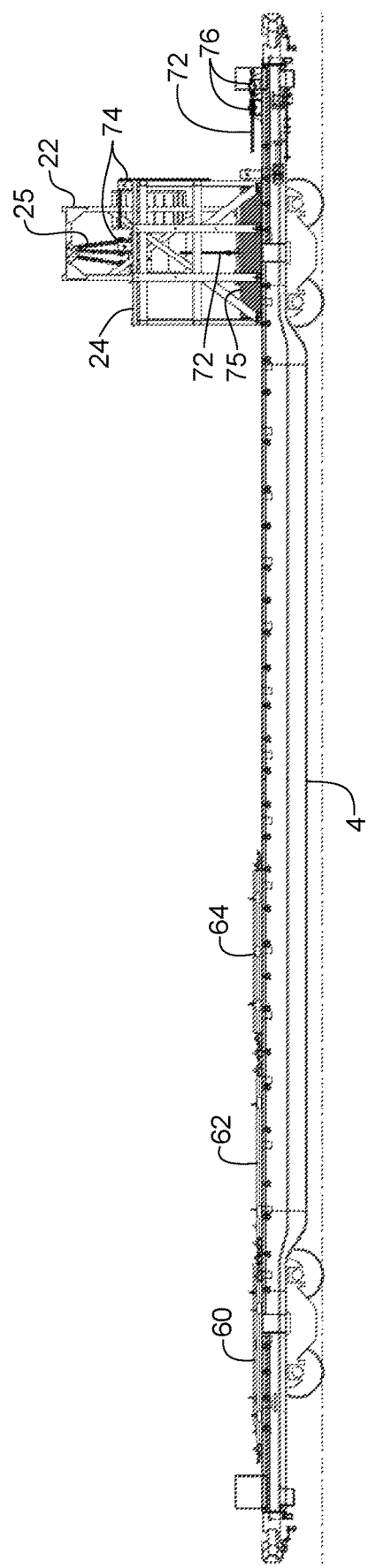
FIG. 6 is a side view drawing of a mid-support flatcar according to an illustrative embodiment of the present invention.

Reference is directed to FIG. 5 and FIG. 6, which are a top view drawing and a side view drawing, respectively, of a mid-support flatcar 4 according to an illustrative embodiment of the present invention. A mid-support fixture 22 is attached to the mid-support flatcar 4, and includes a sling 23 slung with chains 25 to support the middle-portion of the wind turbine blade (not shown) during loaded transport. A pair of lateral guides 27, 29 are fixed to the mid-support fixture 22 to locate and control lateral movement of the blade (not shown). Thus, it can be appreciated that the weight of the blade is supported by the mid-support fixture 22 and the root-support fixture (item 20, FIGS. 3-4).

The mid-support flatcar 4 also includes plural counterweights 60, 62, 64, and 66 selected and positioned to balanced the offset load of the blade (not shown) during loaded transport. During unloaded transport, counterweight 64 is relocated to position 68 and secured with twistlock fasteners 69. Counterweight 66 is relocated outwardly from twistlock fasteners 65 to twistlock fasteners 67. The net effect of these relocations is to place two counterweights 60, 62 on a first side of flatcar 4, and place two counterweights 66, 64 on the opposite side of the flatcar 4, thereby balancing the flatcar 4 during unloaded transport. The pre-placement of twistlock fasteners facilitates quick turn-around between loaded transport and unloaded transport, and vice versa.

The mid-support flatcar also includes a gravity weight assembly 24. This assembly includes a stack of weights 75 therein, which are connected to a tension line 72. In the illustrative embodiment, the tension line 72 is a steel chain. Other tension line materials may also be used, such as steel cable, and etc. A pair of chain pulleys 74 are disposed upon the gravity weight assembly 24, as illustrated, to route the tension line 72 over to the side and down to the surface of the flatcar 4. The tension line 72 is further routed by additional pulleys 76 to route the tension line over the railcar couplers and toward the adjacent flatcar (not shown). Thus unique feature of the present embodiment enables designers to place the gravity weight on a separate flatcar from the blade-pusher fixture (not shown), which will be more fully discussed hereinafter. In operation, the weights 75 rest upon the flatcar 4 and tension on the tension line 72 lifts the weights 75 upwardly, thereby coupling the force of gravity on the weights to the tension line 72. As will be more fully discussed hereinafter, as the consist traverses a curved portion of railway, the wind turbine blade shifts sideways relative to the flatcar, and it is the force of the wind turbine blade against the blade-pusher posts that move the posts laterally, and induce tension in the tension line 72 to lift the weights and transfer the force of gravity against the blade.

Figure 7:
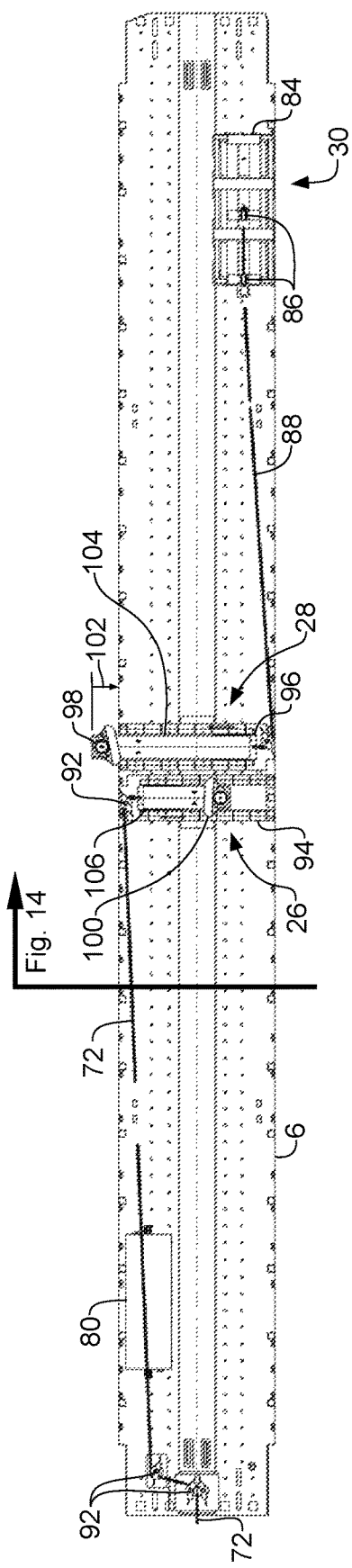
FIG. 7 is a top view drawing of a blade-pusher flatcar according to an illustrative embodiment of the present invention.
Figure 8:
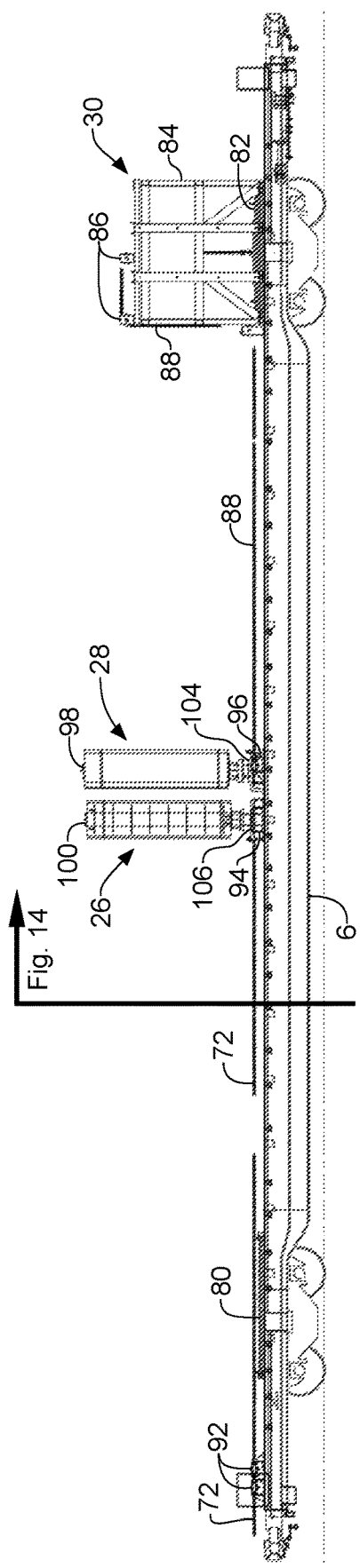
FIG. 8 is a side view drawing of a blade-pusher flatcar according to an illustrative embodiment of the present invention.

Reference is directed to FIG. 7 and FIG. 8, which are a top view drawing and a side view drawing, respectively, of a blade-pusher flatcar 6 according to an illustrative embodiment of the present invention. Note the section view reference to FIG. 14. In FIGS. 7 and 8, a first blade-pusher fixture 26 and a second blade pusher fixture 28 are disposed upon the blade-pusher flatcar 6, each having a corresponding upright blade-pusher post 100, 98 that are aligned on opposing sides of the curved portion of the wind turbine blade (not shown, see FIGS. 1 & 2). With this arrangement, while the consist is on a straight section of track, the curved-portion of the blade does not engage either of the blade-pusher posts 100, 98, because the fixtures 26, 28 are in centered and static position. However, as the consist rounds a curved section of track, the curved portion of the blade swings toward one side of the flatcar 6 or the other, as the blade-pusher flatcar 6 is laterally displaced along the curve. This relative movement causes the curved-portion to engage one of the blade-pusher posts 100, 98. This action causes the blade-pusher posts 100, 98 to be displaced laterally in their respective fixtures 26, 28. Note that the structure of the fixtures will be more fully discussed hereinafter. Each of blade-pusher posts 100, 98 are coupled to a corresponding tension line 72, 88, respectively, which are in turn couple to respective gravity weight assemblies (24 in FIGS. 5, 6) and 30. As was discussed in the previous paragraph, this action causes the weights to be lifted, thereby applying the force of gravity through the tension lines 72, 88, to the blade-pusher posts 100, 98 and against the curved-curved portion of the blade (not shown). The net effect of these actions is manifold. First, the blade-pusher posts 100, 98 are displaced laterally, inducing the force of gravity from the weights. Second, the force of gravity applied to the curved-portion of the blade cause the blade to flex and bend, resulting in a straightening of the blade. Third, the bending forces applied to the blade urge the middle portion of the blade against the blade guides (items 27, 29 in FIGS. 5-6) in the mid-support fixture (item 22 in FIGS. 5-6), which acts as a fulcrum to these forces. Fourth, the fulcrum forces induce an opposing lateral force at the root end of the blade, which urges the lateral translation of the root support fixture (item 20 in FIGS. 3-4). Thus, it can be appreciated that the action of the blade-pusher fixtures 26, 28 causes straightening and repositioning of the blade along the consist, with an action that centers the blade and reduces the amount and extent of lateral overhang, thereby reducing the required railroad profile clearances.

Continuing with FIGS. 7 and 8, note that the first blade bending fixture 26 includes a first guide rail 94 and a first pusher-sled 106, which supports the first blade-pusher post 100. It is this structure that enables and controls lateral movement of the first blade-pusher post 100. The tension line 72 is coupled to the first pusher-sled 106, although it could also be coupled to the post 100 directly. Similarly, the second blade bending fixture 28 includes a second guide rail 96 and a second pusher-sled 104, which supports the second blade-pusher post 98. It is this structure that enables and controls lateral movement of the second blade-pusher post 98. The tension line 88 is coupled to the second pusher-sled 104, although it could also be coupled to the post 98 directly. The first tension line 72 is coupled to the first gravity weight assembly (item 24, FIGS. 5-6) on the mid-support flatcar. The second tension line 88 is coupled to a second gravity-weight assembly 30 on the blade-pusher flatcar 6.

The second gravity weight assembly 30 includes a stack of weights 82 located and guided by a frame 84, and which are connected to tension line 88. In the illustrative embodiment, the tension line 88 is a steel chain. A group of chain pulleys 86 are disposed upon the gravity weight assembly frame 84, as illustrated, to route the tension line 88 over to the side and down to the surface of the flatcar 6 and over to the second blade-pusher fixture 28. In operation, the weights 82 rest upon the flatcar 6 and tension on the tension line 88 lifts the weights 82 upwardly, thereby coupling the force of gravity on the weights to the tension line 88. The blade-pusher flatcar 6 also includes a counterweight 80 to offset and balance the load of the gravity-weight assembly 30. This counterweight 80 does not need to be relocated for unloaded transport of the consist because the gravity-weight assembly remains in place during unloaded transport. Note that the second blade-pusher fixture 28 blade-pusher post 98 and sled 104 extend beyond the side of the blade-pusher flatcar 6, which increases the rail clearance profile. During unloaded transport, this assembly is slid inboard of the flatcar 6 and is locked into position to thereby maintain the minimum possible railway profile clearance.

Figure 9:
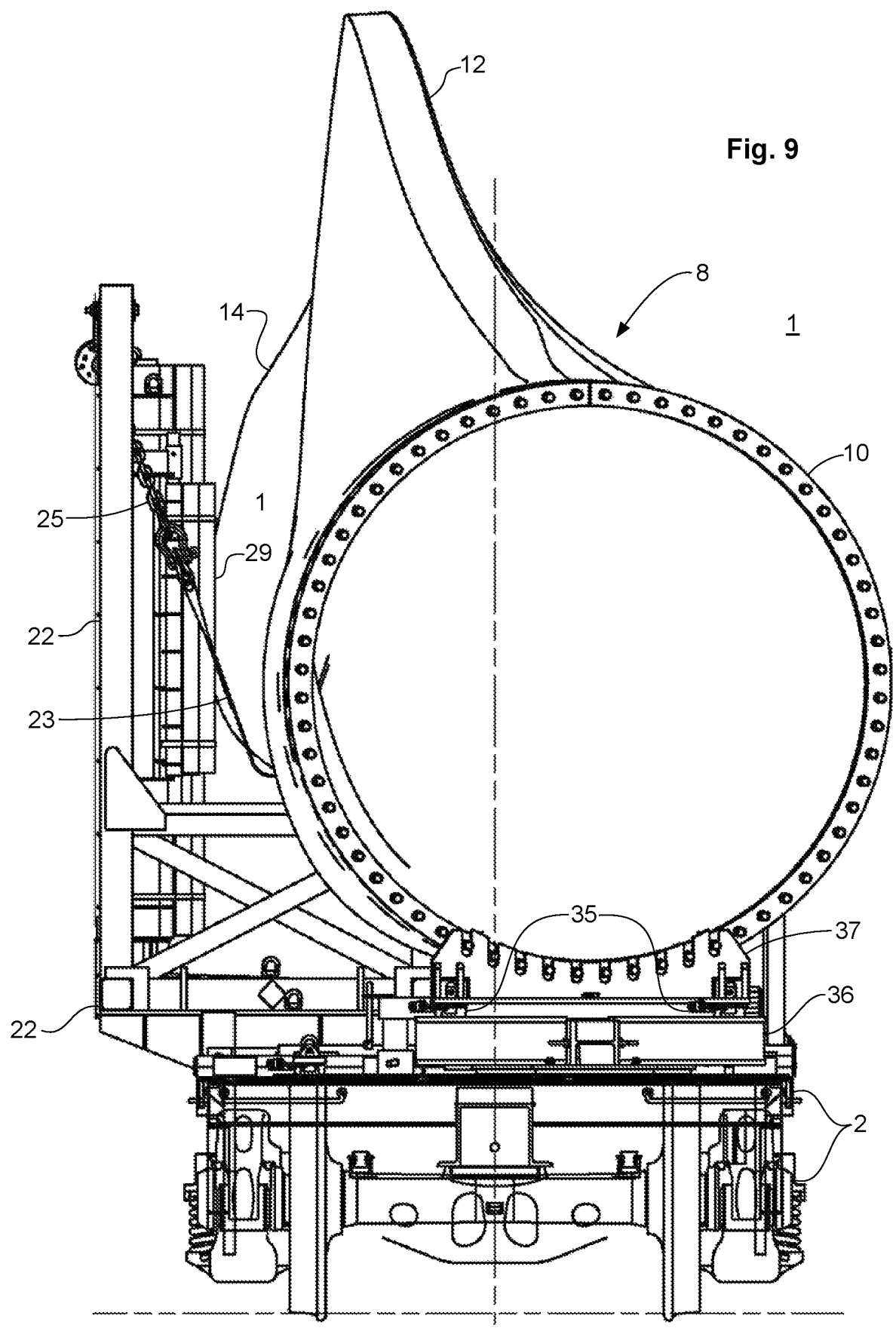
FIG. 9 is a root end view drawing of a consist of rail flatcars transporting a wind turbine blade according to an illustrative embodiment of the present invention.

Reference is directed to FIG. 9, which is a root end view drawing of a consist of rail flatcars 1 transporting a wind turbine blade 8 according to an illustrative embodiment of the present invention. The root-support flatcar 2 is visible, with the root end flange 10 of the wind turbine blade 8 also in view. The broad root-portion 12 of the blade 8 can also be seen, which extends to the middle-portion 14, also visible. Note that the bolster engagement member 36 supports a bolster 37, which is bolted to the root end flange 10 of the blade 8. It is common for the bolster 37 to remain connected to the blade 8 during intermodal transportation transfers of the blade 8. This is why twistlock fasteners 35 are useful in coupling the bolster 37 to the bolster support member 36. The mid-support fixture 22 is also illustrated with the sling 23 slung with chains 25 from the mid-support fixture 22. Also note the position of the lateral blade guide 29 and the location it engages the middle-portion 14 of the blade 8. In this view, note that the mid-support fixture 22 overhangs the profile of the flatcar 2.

Figure 10:
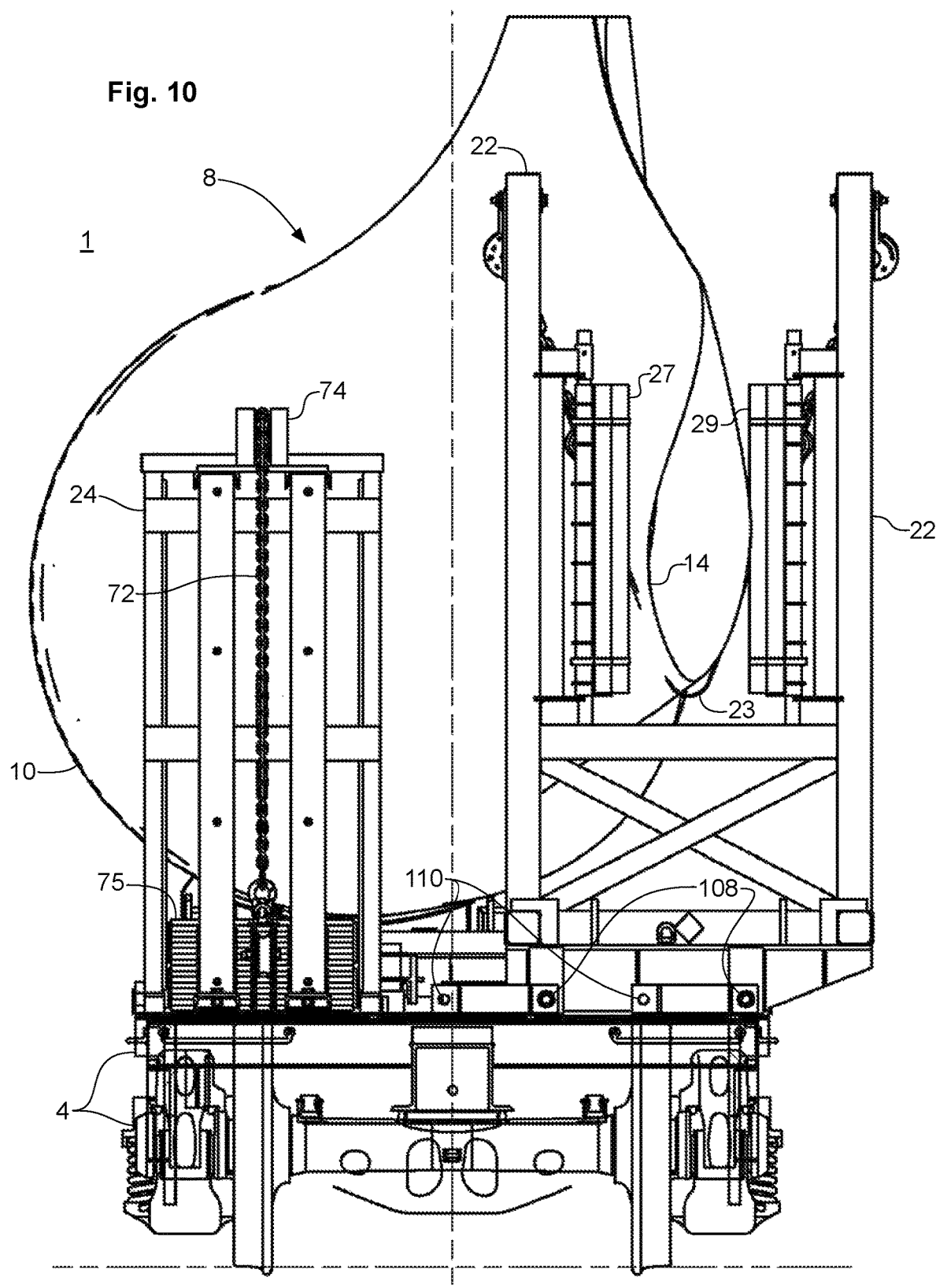
FIG. 10 is a section view drawing of a consist of rail flatcars transporting a wind turbine blade according to an illustrative embodiment of the present invention.

Reference is directed to FIG. 10, which is a section view drawing of a consist 1 of rail flatcars transporting a wind turbine blade 8 according to an illustrative embodiment of the present invention. The orientation of this section view is identified in FIGS. 1 & 2. In FIG. 4, the mid-support flatcar 4 is illustrated with both the mid-support fixture 22 and a gravity weight assembly 24 welded to the deck of the flatcar 4. The wind turbine blade 8 is presented, with the middle-portion 14 located between the first and second lateral blade guides 27, 29 locating its position, and the root end 10 beyond. Note that the root end 10 overhangs the flatcar by a substantial distance, even when in the straight-consist orientation, as illustrated. The blade support sling 23 can also be seen. Note that the mid-support fixture 22 overhangs the flatcar 4 profile. There are two pair of mounting pin holes 108, 110 that enable logistics professionals to move the fixture 22 between the loaded for transport position (illustrated) and the unloaded position, where the mid-support fixture does not overhang the flatcar 4. A pair of pins through the loaded position holes 108 can be seen. When relocated, the fixture 22 is moved inboard and the pins are inserted in the unloaded position holes 110. The gravity weight assembly 24 includes a stack of weights 75 and the tension line chain 72, routed over a pulley 74, as described hereinbefore.

Figure 11:
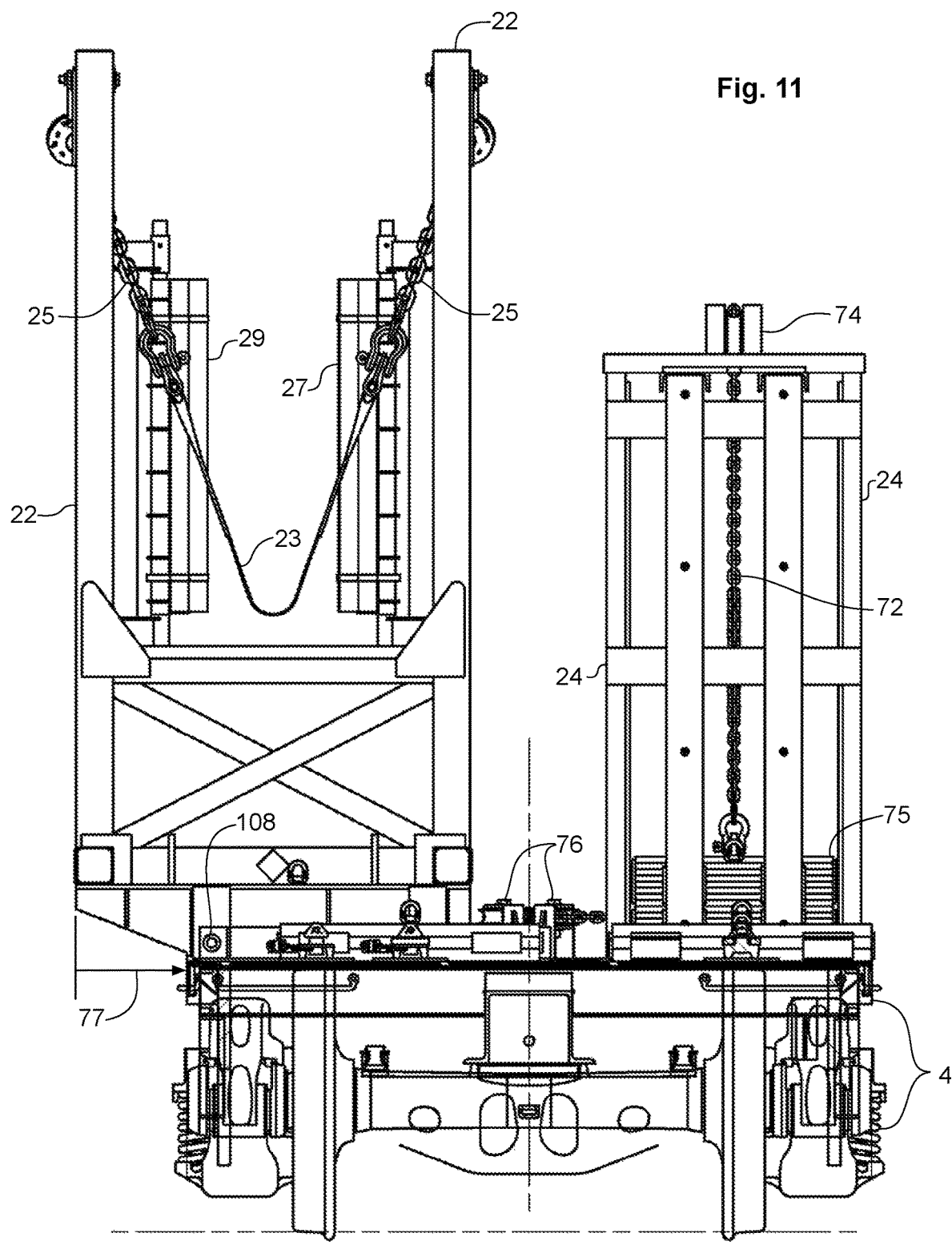
FIG. 11 is a section view drawing of a mid-support flatcar according to an illustrative embodiment of the present invention.

Reference is directed to FIG. 11, which is a section view drawing of a mid-support flatcar 4 according to an illustrative embodiment of the present invention. The orientation of this section view is identified in FIGS. 1 & 2. In FIG. 4, the mid-support flatcar 4 is illustrated with both the mid-support fixture 22 and a gravity weight assembly 24 welded to the deck of the flatcar 4, but with the blade not illustrated for clarity. The mid-support fixture 22 includes the blade sling 23 slung from chains 25. The first and second lateral blades guides 27, 29 are fixed to the fixture 22, and serve to limit lateral movement of the blade (not shown) and to act as fulcrums against forces applied elsewhere along the length of the blade. The mid-support fixture 22 overhangs 77 the side of the mid-support flatcar 4, as illustrated. In the loaded for transport position, mounting hole 108 locates the lateral, overhung 77, position of the mid-support fixture 22. Also illustrated in this view is gravity weight assembly 24, which includes a stack of gravity weights 75, which are located and guided therein. The gravity weights 75 are lifted by a chain tension line 72 when the blade (not shown) engages a blade-pusher fixture (not shown). The chain 72 is routed about chain pulleys 74 and 76.

Figure 12:
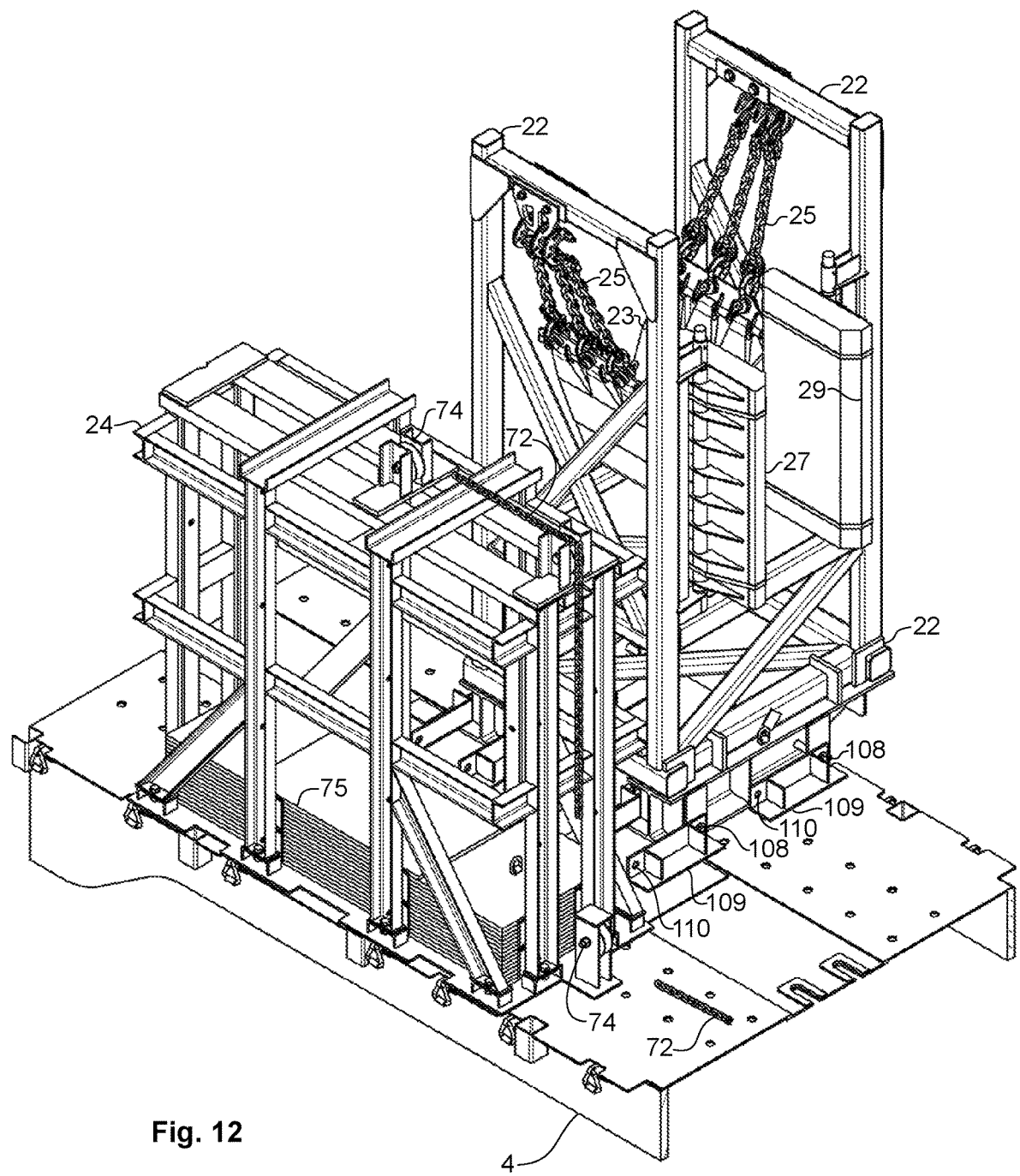
FIG. 12 is a perspective view drawing of a mid-support fixture and a gravity weight assembly on a rail flatcar according to an illustrative embodiment of the present invention.

Reference is directed to FIG. 12, which is a perspective view drawing of a mid-support fixture 22 and a gravity weight assembly 24 on a mid-support flatcar 4 according to an illustrative embodiment of the present invention. FIG. 12 corresponds with FIG. 11. In the perspective view or FIG. 12, the cage-like structure of the gravity weight assembly 24 is revealed. The stack of weights 75 is comprised of steel plates, the quantity of which are selected to accommodate the gravity weight force and blade bending force requirements. The tension line chain 72 is routed over the top of the fixture 24 and down to the deck-level of the flatcar 4 by chain pulleys 74. The mid-support fixture 22 is also illustrated, and this includes the blade sling 23 and support chains 25. The lateral blade guides 27, 29 are vertically pivotally mounted to the mid-support fixture 22 to facilitate alignment with the blade (not shown) surfaces, and are covered with a padded material, such as closed-cell polymeric foam. Note that the mid-support fixture 22 is attached to plural deck mounting brackets 109, which are welded to the mid-support flatcar 4 deck. Pairs of mounting holes 108, 110 are formed through the deck mounting brackets 109, which enable dual mounting positions for the mid-support fixture 22. One position overhangs the flatcar 4 for loaded transport of the blade (not shown), and the other maintains the entire fixture 22 inboard of the flatcar 4 profile for unloaded transport of the consist, as discussed hereinbefore.

Figure 13:
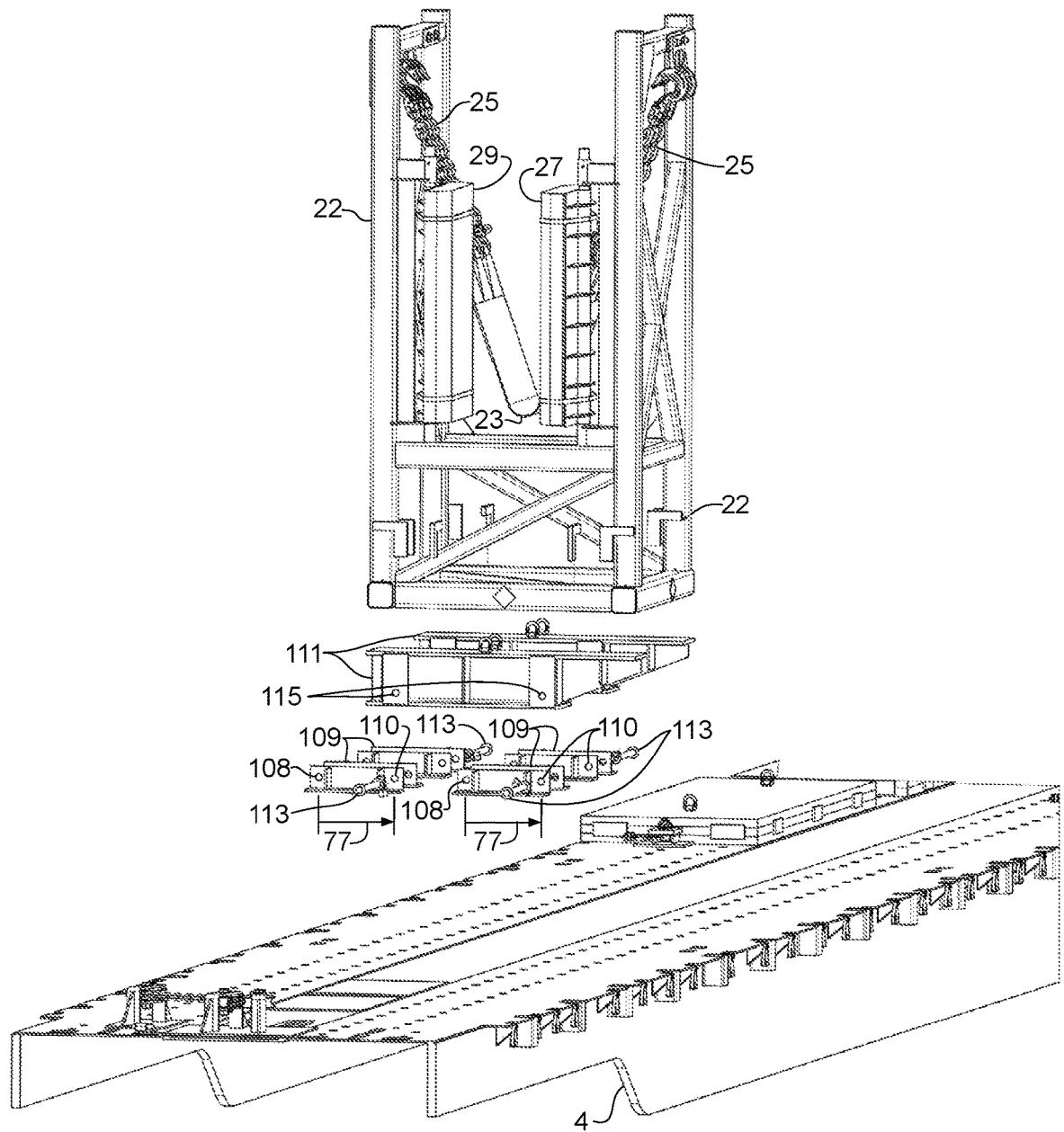
FIG. 13 is a, exploded perspective view drawing of a mid-support fixture according to an illustrative embodiment of the present invention.

Reference is directed to FIG. 13, which is an exploded perspective view drawing of a mid-support fixture 22 according to an illustrative embodiment of the present invention. This exploded view provides further details on the mounting position and structure. Plural deck mounting brackets 109 are welded to the deck of the mid-support flatcar 4. Each bracket 109 includes an inboard mounting hole 110 and and outboard mounting hole 108, through which mounting pins 113 may be selectively inserted. A base bracket 111 is disposed between the plural deck mounting brackets 109 and the mid-support fixture 22. The base bracket 111 includes mounting holes 115, which are selectively aligned with the inboard or outboard mounting holes 110, 108 of the plural deck mounting brackets 109, and through which mounting pins 113 are inserted, as illustrated. In this manner, the mid-support fixture 22 can be positioned in either of the overhung, loaded transport position, or the non-overhung unloaded transport positions.

Figure 14:
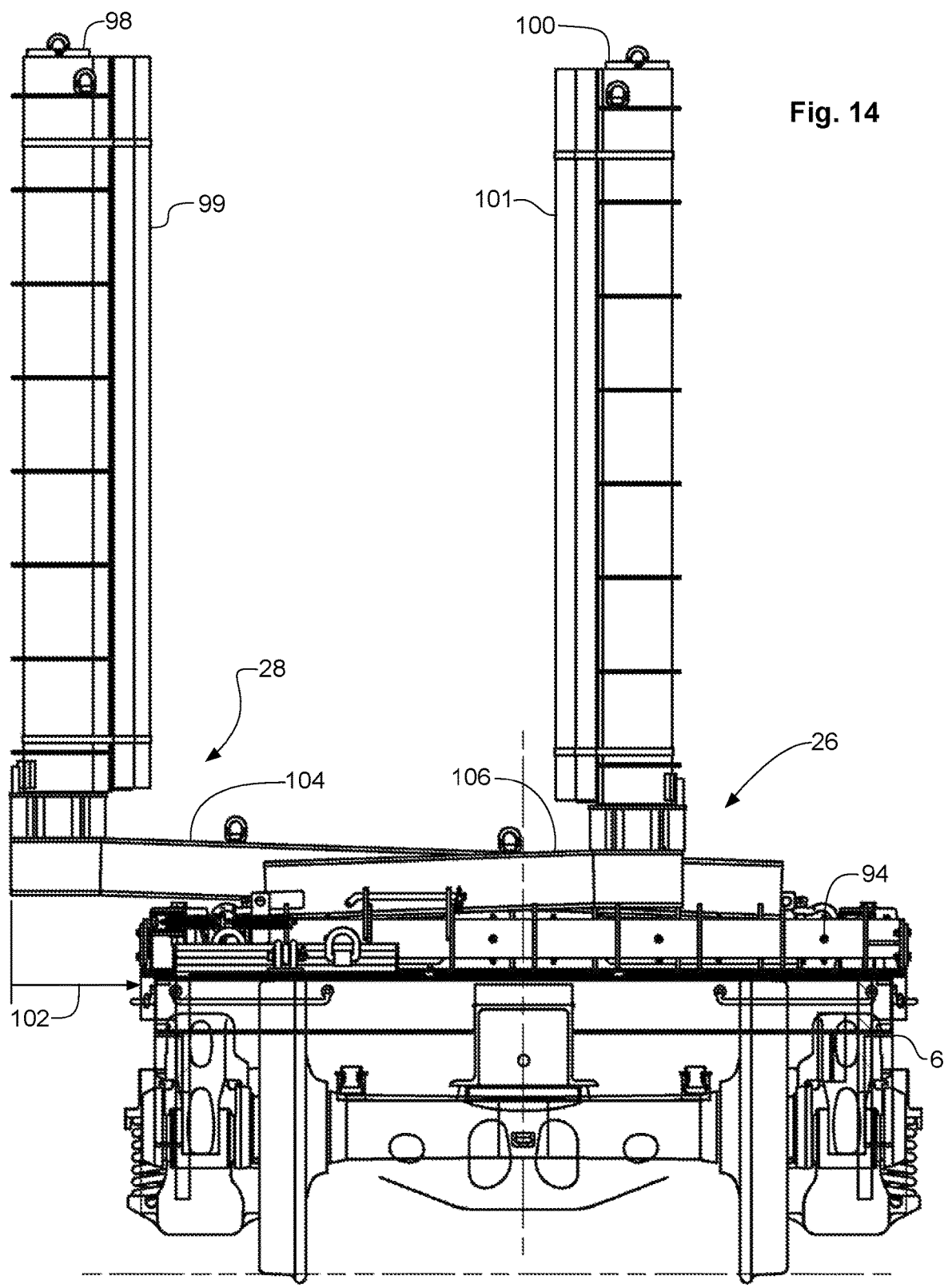
FIG. 14 is a section view drawing of a blade-pusher flatcar according to an illustrative embodiment of the present invention.

Reference is directed to FIG. 14, which is a section view drawing of a blade-pusher flatcar 6 according to an illustrative embodiment of the present invention. This section view orientation is identified in FIGS. 6 and 7. In FIG. 14, the first blade-pusher fixture 26 and the second blade-pusher fixture 28 are presented. Note that the second blade-pusher fixture 28 overhangs 102 the profile of the blade-pusher flatcar 6. The first blade-pusher fixture 26 includes a first blade-pusher post 100, which includes a blade engagement member 101 having a padded material, such as closed cell polymeric foam, for engaging the surface of the curved-portion of the blade (not shown). The first blade-pusher fixture 26 includes a first laterally articulated mount, including a first guide rail 94 attached to the flatcar 6 deck and a first pusher-sled 106 that slidably engages the first guide rail 94 along a lateral axis, in this manner, the first blade-pusher post 100 is enabled to slide laterally in response to engagement with a first side of the blade (not shown). Similarly, the second blade-pusher fixture 28 includes a second blade-pusher post 98, which includes a blade engagement member 99 having a padded material, such as closed cell polymeric foam, for engaging the surface of the curved-portion of the blade (not shown). The second blade-pusher fixture 28 includes a second laterally articulated mount, including a second guide rail (not visible in this view) attached to the flatcar 6 deck and a second pusher-sled 104 that slidably engages the second guide rail along a lateral axis. In this manner, the second blade-pusher post 98 is enabled to slide laterally in response to engagement with a second side of the blade (not shown).

Figure 15:
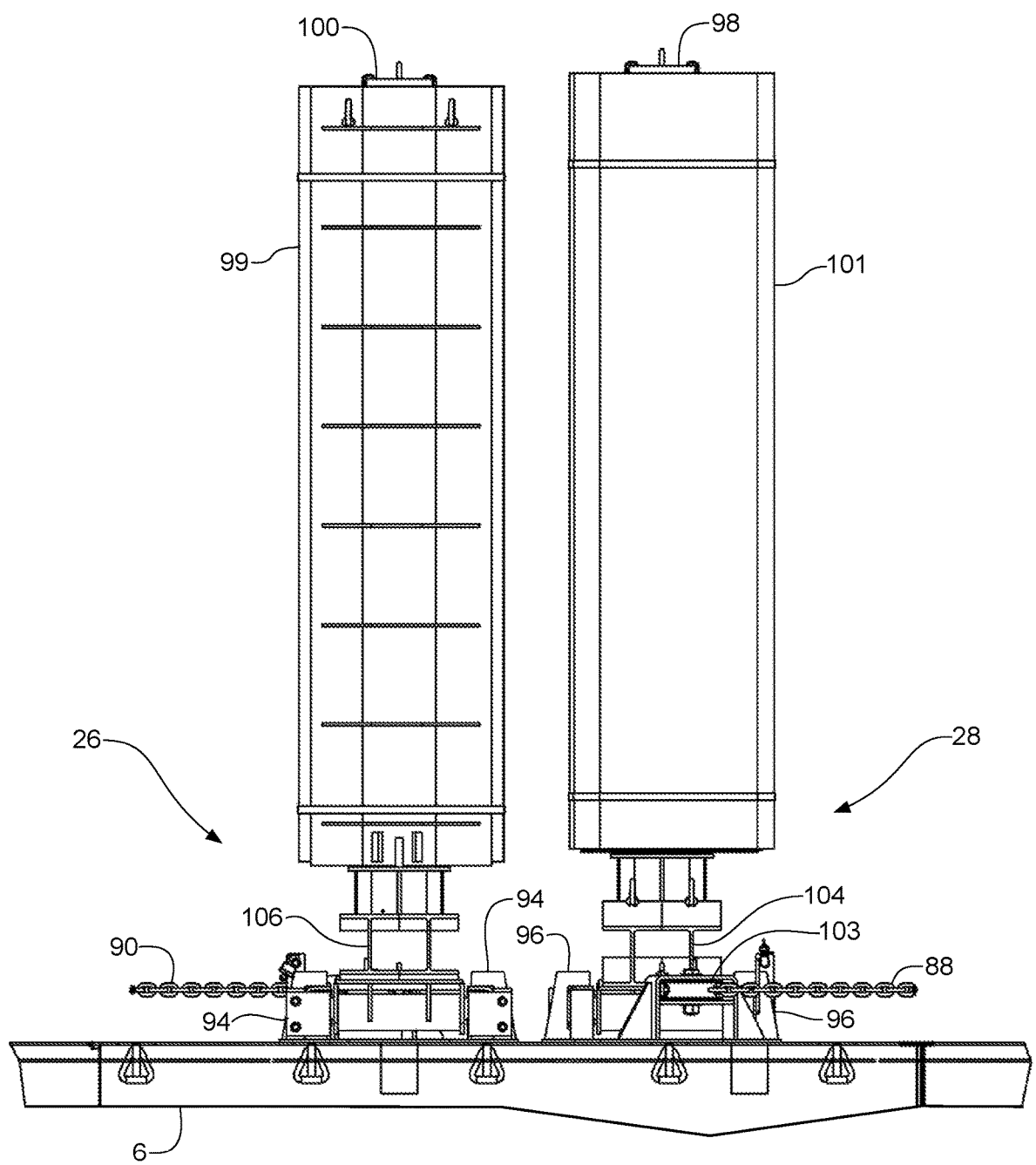
FIG. 15 is a partial side view drawing of blade pusher fixtures on a blade-pusher flatcar according to an illustrative embodiment of the present invention.

Reference is directed to FIG. 15, which is a partial side view drawing of blade pusher fixtures 26, 28 on a blade-pusher flatcar 6 according to an illustrative embodiment of the present invention. A first blade-pusher fixture 26 includes the first blade-pusher post 100 with the first blade engagement member 99 pivotally attached thereto about a vertical axis to facilitate alignment with a first blade surface (not shown). The first blade-pusher post 100 is fixed to a first pusher-sled 106 that slidably engages a first guide rail 94 along a lateral axis, which is welded to the blade-pusher flatcar 6 deck, as illustrated. A first tension line chain 90 is attached to the first pusher-sled 106 to couple the force of gravity from a first gravity weight assembly (not shown). The first tension line chain 90 is routed about plural chain pulleys (not shown) between the first pusher-sled 106 and the first gravity weight (not shown). Similarly, a second blade-pusher fixture 28 includes the second blade-pusher post 98 with the second blade engagement member 101 pivotally attached thereto about a vertical axis to facilitate alignment with a second blade surface (not shown). The second blade-pusher post 98 is fixed to a second pusher-sled 104 that slidably engages a second guide rail 96 along a lateral axis, which is welded to the blade-pusher flatcar 6 deck, as illustrated. A second tension line chain 88 is attached to the second pusher-sled 104 to couple the force of gravity from a second gravity weight assembly (not shown). The second tension line chain 88 is routed about plural chain pulleys 103 between the second pusher-sled 104 and the second gravity weight assembly (not shown).

Figure 17:
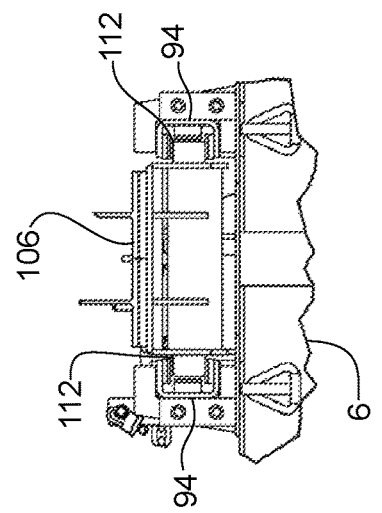
FIGS. 16, 17, and 18 are side view, end view and perspective view drawings, respectively, of a guide rail and sled in a blade-pusher fixture according to an illustrative embodiment of the present invention.
Figure 18:
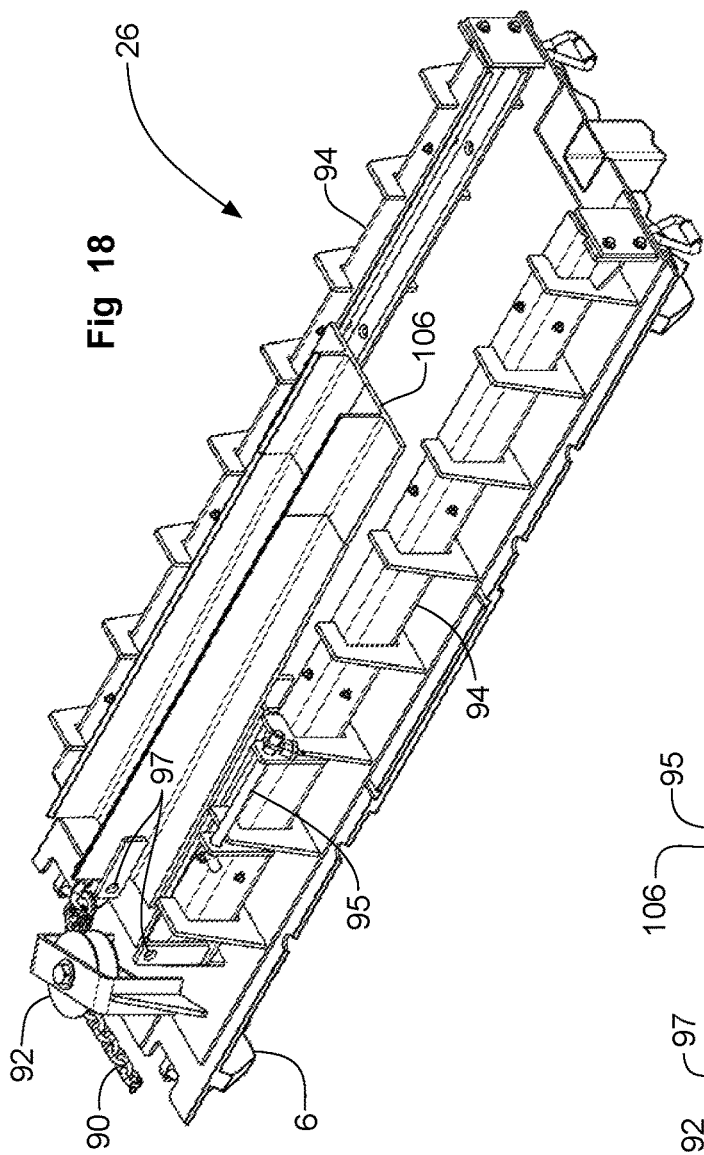
Figure 16:
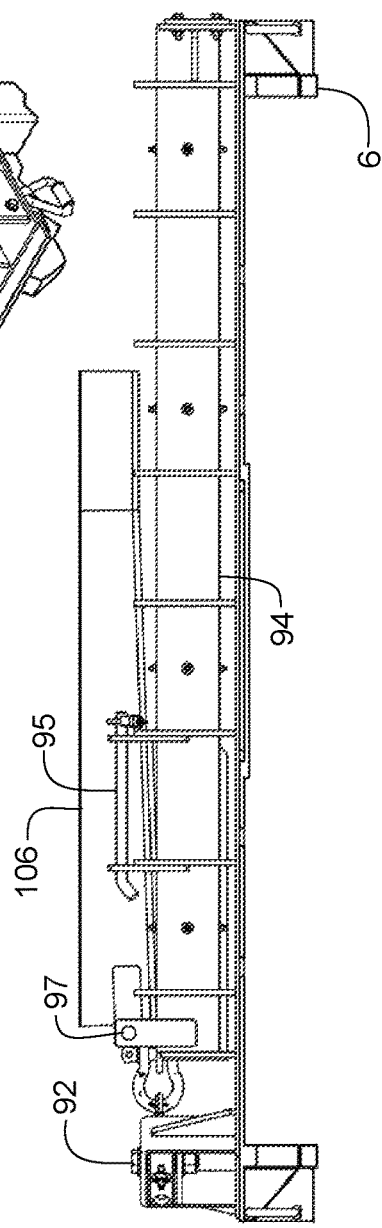

Reference is directed to FIGS. 16, 17, and 18, which are side view, end view and perspective view drawing, respectively, of the first guide rail 94 and first pusher sled 106 in the first blade-pusher fixture 26 according to an illustrative embodiment of the present invention. The first guide rail 94 comprises two opposing channels, welded to the blade-pusher flatcar 6, that are line with a low friction lining 112, such as ultra-high-molecular-weight polyethylene (UHMWPE). The first pusher sled 106 engages the low friction lining 112 to facilitate low friction lateral movement of the first pusher sled 106 with respect to the first guide rail 94. The first tension line chain 90 is coupled to the first pusher-sled 106, and routed about plural chain pulleys (only one is illustrated) to couple the force of gravity to the first pusher-sled 106, as discussed hereinbefore. Note also that a pair of aligned holes 97 in the guide rail 94 and pusher-sled 106 are provided, together with a locking pin 95, to engage and retain the pusher-sled 106 in a fixed position during unloaded transport. The second blade-pusher fixture (item 28 in FIG. 14) includes a like feature, which locates the pusher sled in the aforementioned retracted position.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A fixture system for rail transport of a wind turbine blade that extends longitudinally from a root-end through a middle-portion to a curved-portion, upon a consist of a root-support flatcar, a mid-support flatcar, and a blade-pusher flatcar, comprising:
   a root-support fixture, disposed upon the root-support flatcar, which includes an articulated mount, connected to a bolster that supports the root-end, and which enables a lateral translation path of said bolster together with the root-end;
   a mid-support fixture, disposed upon the mid-support flatcar, having a blade sling slung from a support-frame to support the middle-portion, and having a first and a second lateral blade-guide on opposing sides of the middle-portion to limit lateral movement thereof, and to act as a fulcrum with respect to lateral forces applied elsewhere upon the blade;
   a first blade-pusher fixture, disposed upon the blade-pusher flatcar, having a first laterally articulated mount with a first blade-pusher post extending therefrom that is aligned to intermittently engage a first side of the curved-portion, and coupled to a first gravity weight through a first tension line to thereby apply a first gravity force laterally to the first side of the curved portion, and to enable lateral movement of said first blade-pusher post, in response to lateral movement in a first direction of the blade relative to the consist during transport, and wherein said first gravity force partially bends the blade, applies a first fulcrum force against said first lateral blade-guide, and translates the root end in an opposing lateral direction, and
   a second blade-pusher fixture, disposed upon the blade-pusher flatcar, having a second laterally articulated mount with a second blade-pusher post extending therefrom that is aligned to intermittently engage a second side of the curved-portion, and coupled to a second gravity weight through a second tension line to thereby apply a second gravity force laterally to the second side of the curved portion, and to enable lateral movement of said second blade-pusher post, in response to lateral movement in a second direction of the blade relative to the consist during transport, and wherein said second gravity force partially bends the blade, applies a second fulcrum force against said second lateral blade-guide, and translates the root end in an opposing lateral direction.

2. The fixture system of claim 1, and wherein:
   said root-support fixture articulated mount further includes a deck pivot fixed to the root support flatcar, a radius arm pivotally coupled at a first end to said deck pivot, and having a bolster engagement member at a second end for supportively engaging said bolster, to thereby control said lateral translation path along an arc.

3. The fixture system of claim 2, and wherein said root support fixture further comprises:
   a bearing plate disposed upon the root-support flatcar, positioned to slidably engage and support said bolster engagement member as it slides along said lateral translation path.

4. The fixture system of claim 2, and wherein said root-support fixture further comprises:
   a vertical retention member coupled to the root support flatcar, which is routed above said radius arm to thereby limit vertical movement thereof and retain said radius arm in pivotal engagement with said deck pivot while enabling said lateral translation path of said bolster.

5. The fixture system of claim 1, and wherein said first blade-pusher post laterally articulated mount further comprises:
   a first guide rail fixed to the blade-pusher flatcar;
   a first pusher-sled slideably engaged with said first guide rail along a lateral direction of movement, and wherein said first blade-pusher post is fixed to said first pusher-sled.

6. The fixture system of claim 5, and wherein:
   said first guide rail comprises a pair of opposing channels having low friction liners disposed therein for slidably engaging said first pusher-sled.

7. The fixture system of claim 1, and and further comprising:
   a first gravity-weight frame fixed to said blade-pusher flatcar for retaining and aligning said first gravity weight, and wherein
   said first tension line is a chain that is routed about at least a first pulley to couple said first blade-pusher post with said first gravity weight, and wherein
   said first gravity weight rests against the blade-pusher flatcar until the curved portion of the blade engages said first blade-pusher post and lifts said first gravity weight in response thereto, thereby coupling said first gravity force through said first tension line.

8. The fixture system of claim 7, and further comprising:
   a second gravity-weight frame fixed to said mid-support flatcar for retaining and aligning said second gravity weight, and wherein
   said second tension line is a chain that is routed about plural pulleys between the mid-support flatcar and the blade-pusher flatcar, to couple said second blade-pusher post to said second gravity weight, and wherein
   said second gravity weight rests upon said mid-support flatcar until the curved portion of the blade engages said second blade-pusher post and lifts said second gravity weight in response thereto, thereby creating said second force of gravity.

9. A method of transporting by rail, a wind turbine blade that extends from a root-end through a middle-portion to a curved-portion upon a consist of a root-support flatcar, a mid-support flatcar, and a blade-pusher flatcar, using a fixture system including a root-support fixture with an articulated mount connected to a bolster that enables lateral movement thereof, a mid-support fixture having a blade sling slung from a support-frame with first and second lateral blade-guides, and first and second blade-pusher fixtures, each having a laterally articulated mount with corresponding first and second blade-pusher posts extending therefrom, and each with corresponding first and second gravity weights coupled with corresponding first and second tension lines, the method comprising the steps of:
   attaching the root-support fixture to the root-support flatcar and supporting the root-end upon the bolster, thereby enabling lateral movement of the bolster and the root-end of the blade together during transport;
   attaching the mid-support fixture to the mid-support flatcar and supporting the middle-portion of the blade upon the sling, and locating the first and second lateral guides on opposing sides of the middle-portion, thereby limiting lateral movement of the blade, and enabling the lateral guides to act as fulcrums with respect to lateral forces applied elsewhere upon the blade;
   attaching the first blade-pusher fixture to the blade-pusher flatcar, and aligning the first blade-pusher post to intermittently engage a first side of the curved-portion, and coupling the first blade pusher post to the first gravity weight through the first tension line, thereby applying a first gravity force laterally to a first side of the curved portion, and enabling lateral movement of the first blade-pusher post, in response to lateral movement in a first direction of the blade relative to the consist during transport, and thereby enabling the first gravity force to partially bend the blade, apply a first fulcrum force against the first lateral blade-guide, and translate the root end in an opposing lateral direction, and attaching the second blade-pusher fixture to the blade-pusher flatcar, and aligning the second blade-pusher post to intermittently engage a second side of the curved-portion, and coupling the the second blade pusher post to the second gravity weight through the second tension line, thereby applying a second gravity force laterally to a second side of the curved portion, and enabling lateral movement of the second blade-pusher post, in response to lateral movement in a second direction of the blade relative to the consist during transport, and thereby enabling the second gravity force to partially bend the blade, and apply a second fulcrum force against the second lateral blade-guide, and translate the root end in an opposing lateral direction.

10. The method of claim 9, and wherein the root-support fixture articulated mount includes a radius arm with a deck pivot at a first end, and a bolster engagement member at a second end, and further comprising the steps of:

attaching the deck pivot to the root-support flatcar, thereby defining an arcuate lateral translation path of the bolster engagement member at the second end, and attaching the bolster to the bolster engagement member.

11. The method of claim 10, and wherein said root support fixture further includes a bearing plate, and further comprising the steps of:

disposing the bearing plate upon the root-support flatcar at a position to slidably engage and support the bolster engagement member, thereby enabling it to slide along the lateral translation path.

12. The method of claim 10, and wherein the root-support fixture further includes a vertical retention member, further comprising the steps of:

coupling the vertical retention member to the root support flatcar, and positioning it above the radius arm, thereby limiting vertical movement of the radius arm and retaining the radius arm in pivotal engagement with the deck pivot.

13. The method of claim 9, and wherein the first blade-pusher post laterally articulated mount further includes a first guide rail and a first pusher-sled, and further comprising the steps of:

attaching the first guide rail to the blade-pusher flatcar; slideably engaging the first pusher-sled with the first guide rail along a lateral direction of movement, and attaching the first blade-pusher post to the first pusher-sled.

14. The method of claim 13, and wherein the first guide rail includes a pair of opposing channels having low friction liners disposed therein for slidably engaging the first pusher sled.

15. The method of claim 9, wherein the fixture system further includes a first gravity-weight frame, and the first tension line is a chain, and at least a first pulley, the method further comprising the steps of:

attaching the first gravity-weight frame to the blade-pusher flatcar, and retaining and aligning the first gravity weight therein;

routing the first tension chain about the at least a first pulley, thereby coupling the first blade-pusher post with the first gravity weight, and wherein the first gravity weight rests against the blade-pusher flatcar until the curved portion of the blade engages the first blade-pusher post and lifts the first gravity weight in response thereto, thereby coupling the first gravity force through the first tension line.

16. The method of claim 15, wherein the fixture system further includes a second gravity-weight frame, and the second tension line is a chain, and at least a second pulley, the method further comprising the steps of:

attaching the second gravity-weight frame to the mid-support flatcar, and retaining and aligning the second gravity weight therein;

routing the second tension chain about the at least a second pulley, thereby coupling the second blade-pusher post with the second gravity weight, and wherein the second gravity weight rests against the mid-support flatcar until the curved portion of the blade engages the second blade-pusher post and lifts the second gravity weight in response thereto, thereby coupling the second gravity force through the second tension line.

17. The fixture system of claim 1, wherein loads applied to the root-support flatcar by said root support fixture produce first unbalanced loads thereupon, and wherein loads applied to the mid-support flatcar by said mid-support fixture produce second unbalanced loads thereupon, and further comprising:

a first counterweight for disposition upon the root-support flatcar at a loaded-position selected to counterbalance said first unbalanced loads during loaded transport, and wherein said first counterweight is repositionable to a second position selected to balance the root-support flatcar during unloaded transport;

a second counterweight for disposition upon the mid-support flatcar at a loaded-position selected to counterbalance said second unbalanced loads during loaded transport, and wherein said second counterweight is repositionable to a second position selected to balance the mid-support flatcar during unloaded transport.

18. The fixture set of claim 17, further comprising:

a root support fixture lock, attached to the root-support flatcar for engagement with said root-support fixture during unloaded transport to prevent lateral movement thereof.

19. The fixture system of claim 1, wherein the curved-portion of the blade dictates placement of said mid-support fixture at a position that overhangs the mid-support flatcar, and further dictates placement of at least one of said blade-pusher fixtures to overhang the blade-pusher flatcar, and wherein:

said mid-support fixture is repositionable upon the mid-support flatcar between an overhung position for loaded transport, and a non-overhung position for unloaded transport, and wherein said blade-pusher fixture is repositionable upon the blade-pusher flatcar between an overhung position for loaded transport, and a non-overhung position for unloaded transport.

20. The fixture system of claim 19, and wherein:

said mid-support fixture is repositioned at said non-overhung position with a repositionable attachment bracket having locating pins at both of said overhung position and said non-overhung position.

21. The method of claim 9, wherein the load produced by the wind turbine blade creates first unbalanced loads upon the root-support flatcar and second unbalanced loads upon the mid-support flatcar, the method further comprising the steps of:
  counterbalancing the first unbalanced loads by selectively placing a first counterweight upon the root-support flatcar at a loaded-position for use during loaded transport;
  counterbalancing the second unbalanced loads by selectively placing a second counterweight upon the mid-support flatcar at a loaded-position during loaded transport;
  repositioning the first counterweight at an unloaded position selected to balance the root-support flatcar during unloaded transport;
  repositioning the second counterweight at an unloaded position selected to balance the mid-support flatcar during unloaded transport.

22. The method of claim 21, further comprising the step of:
  locking the root-support fixture against lateral movement thereof during unloaded transport of the consist.

23. The method of claim 9, and wherein the curved-portion of the blade dictates placement of the mid-support fixture at a position that overhangs the mid-support flatcar, and further dictates placement of at least one of the blade-pusher fixtures to overhang the blade-pusher flatcar, the method comprising the steps of:
  placing the mid-support fixture upon the mid-support flatcar at a loaded-transport position, wherein a portion of the mid-support fixture overhangs a side of the mid-support flatcar, and supporting the middle-portion load upon the mid-support fixture;
  placing the blade-pusher fixture upon the blade-pusher flatcar, such that a portion of the blade-pusher fixture overhangs the blade-pusher flatcar at the loaded-transport position;
  unloading the blade from the consist;
  repositioning the mid-support fixture to a non-overhung, unloaded-transport position, wherein the mid-support fixture does not overhang the mid-support flatcar, and
  repositioning the blade-pusher fixture to a non-overhung, unloaded transport, position wherein the blade-pusher fixture does not overhang the blade-pusher flatcar.

24. The method of claim 23, further comprising the step of:
  repositioning the mid-support fixture to the non-overhung position with a repositionable attachment bracket having locating pins at both of the overhung loaded-transport position and non non-overhung position.

* * * * *